Dec. 13, 1966    S. YOUNG, JR., ETAL    3,291,667
ETCHING PROCESS FOR SELECTIVELY FORMING WORKPIECE SURFACES
Filed April 10, 1961    2 Sheets-Sheet 1

INVENTORS
SAMUEL YOUNG JR.
DOMINIC C. MITCHELL JR.
BY
Thomas S. MacDonald
ATTORNEY Dec. 13, 1966  S. YOUNG, JR., ETAL  3,291,667
ETCHING PROCESS FOR SELECTIVELY FORMING WORKPIECE SURFACES
Filed April 10, 1961  2 Sheets-Sheet 2

INVENTORS
SAMUEL YOUNG JR.
DOMINIC C. MITCHELL JR.
BY Thomas S. MacDonald
ATTORNEY United States Patent Office 3,291,667
Patented Dec. 13, 1966

3,291,667
ETCHING PROCESS FOR SELECTIVELY
FORMING WORKPIECE SURFACES
Samuel Young, Jr., La Mirada, and Dominic C. Mitchell, Jr., Arcadia, Calif., assignors to North American Aviation, Inc.
Filed Apr. 10, 1961, Ser. No. 101,838
3 Claims. (Cl. 156—18)

The invention relates to a sizing process for selectively forming the surface of a workpiece and more particularly relates to a sizing process particularly adapted for chemically etching the surface of a workpiece to any desired configuration. The term "sizing" as used herein should be broadly understood to mean the application of a material to a workpiece surface to fill in depressions or to build up the contour thereof.

Development of advanced airborne vehicles, for example, has placed an increased emphasis on strength-to-density ratios and rigidity of vehicle components over a relatively wide range of elevated temperatures. Such desired physical characteristics are particularly inherent with the "exotic" type metals such as Rene 41, Vasco-Jet 1000, PH15-7 Mo Steel, Inconel 718, titanium, titanium alloy 16V-2.5 Al, and the like, which metals are utilized in many vehicle component applications. Attempts to mechanically fabricate such metals to a desired shape while yet maintaining extremely close tolerances have proved difficult if not impossible.

This invention has overcome many of the inadequacies of the prior art fabricating methods by providing a sizing process for selectively forming a surface of a workpiece. A surface portion of the workpiece is selectively covered with a suitable sizing material having an etch rate comparable to that of the workpiece. The top surface of the sizing material is selectively formed to correspond to the subsequently formed desired surface configuration of the workpiece. The unit thus formed is then subjected to a chemical etchant which functions to etch the workpiece surface to a configuration conforming to the initial configuration of the top surface of said coating.

An object of this invention is to provide a sizing process for expeditiously forming a workpiece to any desired configuration.

Another object of this invention is to provide a sizing process for expeditiously and efficiently selectively contouring the surface of a workpiece.

Still another object of this invention is to provide a sizing process particularly adapted for selectively chemically etching the surface of high strength type metals.

Still another object of this invention is to provide a sizing process for removing undesirable low and high portions on the surface of a workpiece to thus provide a substantially smooth and regular surface.

Still another object of this invention is to provide a sizing process for selectively changing the geometry of a workpiece.

These and other objects of this invention will become apparent from the following description taken in connection with the accompanying drawings, in which:

FIG. 1 discloses a workpiece having a roughened surface;

FIG. 2 discloses the roughened surface of the workpiece of FIG. 1 as it would appear after a sizing material has been selectively coated thereon;

FIG. 3 discloses the unit of FIG. 2 as it would appear subsequent to the chemical etching thereof;

FIG. 4 discloses a workpiece initially having a substantially square cross-section adapted to be formed to comprise a circular cross-section by means of the novel concept of this invention;

The purpose of this invention is to provide a sizing process for selectively forming a surface of a workpiece. A suitable sizing material preferably having an etch rate comparable to that of the etched workpiece is selectively distributed onto the surface of said workpiece with the top surface of the coating selectively formed to correspond to the subsequently formed workpiece surface. The top surface of the coating is then subjected to a suitable etchant until said etchant effects the desired configuration of the workpiece surface. Such a sizing process is particularly adapted for the removal of low and/or high spots undesirably formed on a workpiece surface. For example, such undesirable low and/or high spots may be due to inherent imperfections imparted to the workpiece during the initial fabrication thereof or such spots may be caused by subsequent warpage of the workpiece. Also, such a sizing process can be uniquely utilized to selectively change the geometry of one or more workpiece surfaces.

Figure 1:
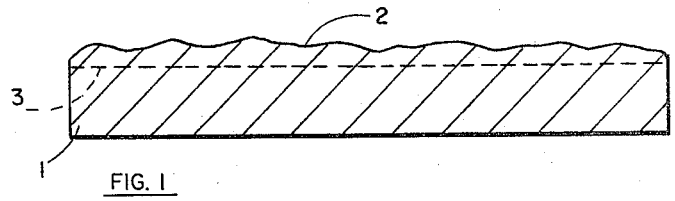
Figure 2:
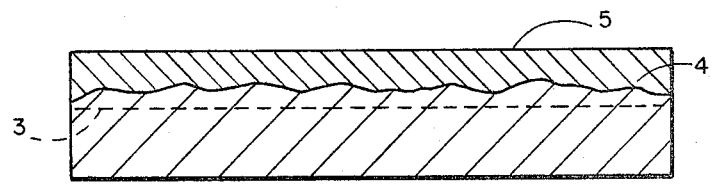
Figure 3:
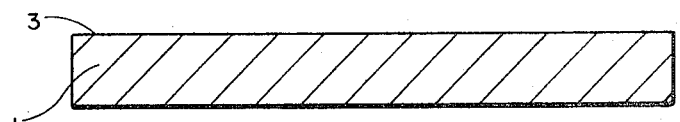

FIGS. 1-3 inclusive disclose a workpiece as it would appear during three successive stages of an etching process. As hereinbefore stated, the novel concepts of this invention are particularly adapted for removing low and/or high spots from a workpiece surface, i.e., to effect a substantially smooth and regular surface. As shown, a workpiece 1 initially comprises a relatively rough and irregular surface 2 undesirably constituting a series of relatively low and high portions. It is desirable in many fabrication operations to remove such relatively low and high irregular surface portions to thus provide a relatively smooth and regular planar type surface as noted by the dotted line 3, for example. Certain design requirements further require that the workpiece be fabricated to comprise a uniform thickness as will be hereinafter more fully explained.

As hereinbefore stated, this invention is particularly adapted for the fabrication of present-day high strength materials such as Rene 41, Vasco-Jet 1000, PH15-7 Mo Steel, titanium, etc., which materials are generally classed in the "exotic" metal grouping. However, it should be noted that the inventive concepts as disclosed herein are also adapted for the fabrication of many other metallic materials as well as many non-metallic materials.

FIG. 2 discloses a sizing constituent 4 which is selectively coated onto the roughened top surface 2 of the workpiece 1. In this particular illustrative showing, the top surface 5 of the sizing material 4 is then constructed and arranged to form a relatively smooth and regular planar type surface 5. To fulfill such desiderata, the sizing material is first bonded onto the workpiece surface 2 by means of conventional forming techniques such as coating or spraying. Subsequent to this bonding step, the top surface 5 of the sizing material may be subjected to conventional milling or grinding techniques, for example, in order to effect a relatively smooth and regular surface.

The sizing material 4 may comprise, for example, a standard easily machined metal preferably having a relatively low boiling point or a constituent comprising an appropriate active pigment mixed with an organic binder. It is further desirable to employ a sizing constituent which has the same or substantially the same etch rate as that of the workpiece 1. For example, such a sizing material may comprise a metal such as copper, cadmium, nickel, aluminum, zinc or any desired proportional combination of such metals. Examples of the active pigment-organic binder sizing material which may be used for the sizing constituent include the proper proportions of one or more active pigment such as iron, nickel, molybdenum, copper, or aluminum powder mixed with a proper proportion of an organic binder such as a standard lacquer, varnish or shellac.

For purposes herein, it should be understood that the active pigment may be deemed to comprise a standard 300 mesh (fine) powder. However, it should be further understood that the particular coarseness of any one particular chosen active pigment primarily depends on the specific work application therefor. Also, it should be further understood, for purposes herein, that the organic binder may comprise a clear synthetic decal lacquer essentially comprising the standard proportions of ethylcellulose, alkyd resin, butyl phthalate (plasticizer) and butyl acetate (solvent). Should it be desired to utilize a non-synthetic type lacquer, nitrocellulose can be substituted in lieu of the above mentioned ethylcellulose. It should be again understood that the physical properties of the particular sizing material selected are preferably such that the material is adapted for ease of fabrication for purposes hereinafter more fully explained.

It should be again particularly noted that by utilizing such a relatively soft (i.e., easily machinable) sizing material such as those above stated, that the outer surface 5 thereof may be easily formed into the desired configuration by means of standard machining techniques, for example. As hereinbefore stated, such standard machining techniques cannot always be applied to the workpiece itself.

Subsequent to the coating or spraying of the sizing material 4 onto the roughened surface 2 of the workpiece, the top surface 5 of the sizing material is subjected to a suitable etchant constituent which is preferably chemically active therewith. Standard etchant constituents may be conveniently employed therewith. One of the prime design requirements is that the chosen etchant constituent remain chemically active with both the sizing constituent and workpiece throughout the entire etching operation. The etchant is applied to the sizing-workpiece unit in a conventional manner, for the predetermined amount of time and at a predetermined temperature, etc. As shown in FIG. 3 the top surface 3 of the finished workpiece is subjected to the etchant until said surface becomes substantially smooth and regular.

Figure 4:
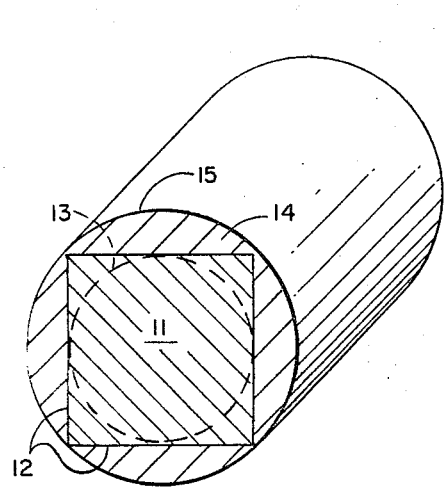

FIG. 4 discloses a second illustrative application of the novel concepts of this invention. FIG. 4 essentially discloses the novel steps of this invention as they would be utilized for changing a substantially square cross-sectional geometry to one of substantially circular geometry. A workpiece 11 is initially fabricated by conventional casting or rolling techniques to comprise a substantially square cross-section defined by the side wall portions 12. In this particular application it is desired to fabricate the workpiece to a substantially circular geometry as shown by the dotted line 13.

To achieve such a desired change in the workpiece geometry, a sizing material 14 is initially selectively coated or sprayed onto the workpiece 11. The outer surface 15 of the sizing material is constructed and arranged in the conventional manner to form a substantially circular cross-sectional geometry 15 which is preferably substantially concentric with the desired circular cross-sectional geometry 13 of the finished workpiece. A standard lathe, for example, may be utilized to fulfill such desiderata. It should be noted that the formed outer circular surface 15 of the workpiece need not necessarily be constructed and arranged to substantially intersect the four corners formed by the side wall portions 12. However, in order to hold the necessitated etch depth to a minimum, i.e., in order to limit the amount of wasted workpiece material, such a relationship is generally desired. The constituents comprising the workpiece 11, the sizing material 14 and the etchant may be the same type utilized, for example, as those hereinbefore set forth in connection with FIGS. 1–3 inclusive.

The workpiece-sizing material combination as shown in FIG. 4 is subsequently subjected to the desired etching bath in the conventional manner as hereinbefore explained in connection with FIGS. 1–3 inclusive. The peripheral surface portions of the unit are thus changed from the substantially circular cross-section 15 to the substantially circular cross-section 13.

Figure 5:
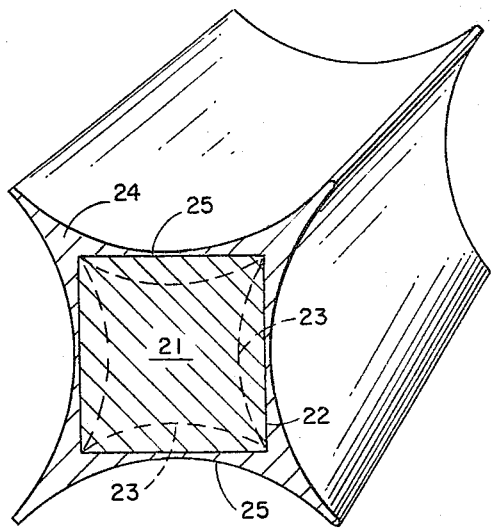
FIG. 5 is a view similar to FIG. 4 wherein a workpiece initially having a square cross-section is adapted to be formed to comprise an irregular cross-section.

FIG. 5 discloses a third possible application of the novel concepts of this invention and more particularly discloses the overall versatility thereof. As shown, a standard workpiece 21 initially comprises a substantially square cross-section defined by four peripheral side walls 22. In this particular application it is desired to form the workpiece 21 so that the fabricated outer wall portions 23 thereof subsequently take the form of two sets of symmetrical and juxtaposed curves substantially of the hyperbolic type.

To achieve this desired configuration, a suitable sizing material 24 is initially selectively coated onto the wall portions 22 of the workpiece 21. The sizing material is constructed and arranged by means of standard fabricating techniques to comprise outer surface portions 25. As shown, the outer surface portions 25 of the sizing material are scaled to conform to the subsequently formed irregular surfaces 23. The materials utilized for the workpiece and sizing material and the conventional etching techniques utilized to fabricate the finished workpiece may comprise the same as those hereinbefore set forth.

Figure 6:
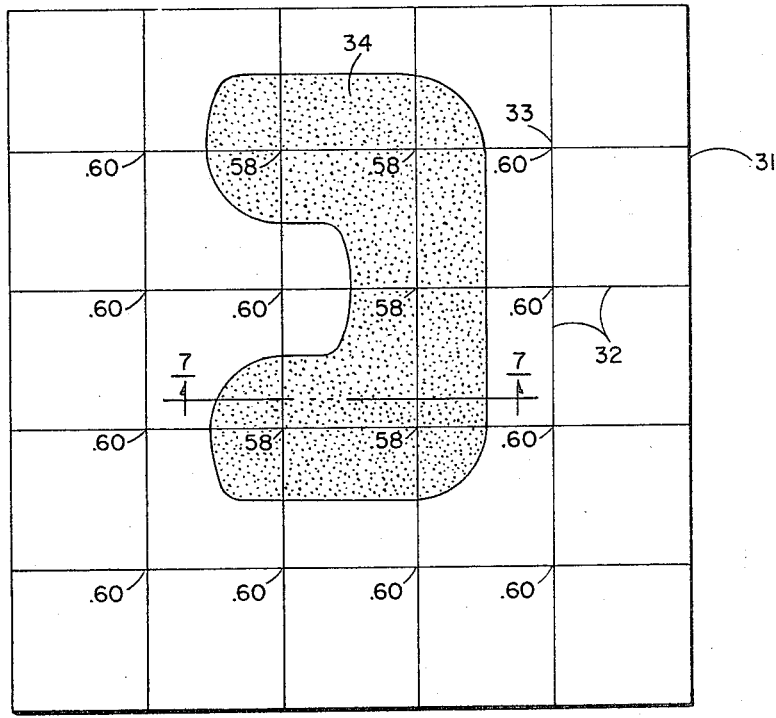
FIG. 6 is a plan view of a measuring step which may be employed with the process comprising the novel concepts of this invention.

FIG. 6 discloses a plan view of a measuring step which may be employed with the hereinbefore described process comprising the novel concepts of this invention. A workpiece 31 is shown as having a gridwork 32 inscribed thereon by conventional marking means such as a pencil. The size of the individual squares (or other configured rectangles, for example) may comprise any dimension depending on the exactness with which it is desired to carry forth the hereinafter explained step.

For illustrative purposes, the points 32 whereat the lines of the gridwork intersect, are shown as comprising varied workpiece thicknesses of 0.60 in. and 0.58 in. A suitable sizing material 34 is selectively coated or sprayed onto the workpiece at those portions which comprise the relatively depressed areas whereat the workpiece comprises a thickness of 0.58 in. As more clearly shown in FIG. 7, the depressed cavity generally noted at 35 is selectively filled with the sizing constituent 34 until the top surface 36 thereof is constructed and arranged to be relatively flush with respect to the surface 37 of the workpiece 31. The sizing constituent has been somewhat enlarged for clarification purposes.

By incorporating such a step into the process it can be readily seen that a substantial saving of sizing material 34 as well as the time and effort of the workmen are realized. The workpiece-sizing unit may then be selectively etched as hereinbefore explained in connection with the illustrated showings of FIGS. 1–5 inclusive. Such a step is particularly adapted to fabricate warped, relatively thin type materials to a uniform thickness of 0.55 in., for example, as shown by the dotted line 38 in FIG. 7.

As hereinbefore stated, the novel concepts of this invention as disclosed in connection with FIGS. 1–7 inclusive are particularly adapted for the accurate fabrication of relatively highly strength type metallic workpieces. For example, it has been found that the etching of a standard titanium alloy 16V–2.5 Al (81.5% titanium, 16% vanadium and 2.5% aluminum, by weight), by means of a basic hydrofluoric-chromic acid etching bath provides for a workpiece-sizing material etch rate of approximately 0.4 mil/min. wherein the sizing material comprises substantially pure zinc.

It has been further ascertained that when a workpiece comprising a standard Rene 41 alloy is sized with a material comprising substantially pure zinc, 15 parts Mo powder-4 parts lacquer (by weight), 17 parts Ni powder-4 parts lacquer (by weight) or 8 parts Fe powder-8 parts Ni powder-3 parts lacquer (by weight), that a common workpiece-sizing material etch rate approximating 0.3 mil/min. is achieved when the unit is immersed in an etching bath essentially comprising hydrochloric acid, nitric acid and a ferric chloride solution.

In applying the novel concepts of this invention to a PH15-7 Mo (annealed) workpiece-sizing material combination utilizing an etching bath essentially comprising hydrochloric, nitric and phosphoric acids, wherein the sizing material comprised substantially pure cadmium, nickel or copper or 10 parts copper powder-4 parts lacquer (by weight), 6 parts copper powder-6 parts iron powder-4 parts lacquer (by weight), or 8 parts nickel powder-8 parts iron powder-3 parts lacquer (by weight), provided a common workpiece-sizing material etch rate approximating 0.3 mil/min.

The above stated workable combinations and in particular the specific sizing materials utilized therewith are set forth in order to more fully illustrate the versatility and overall workability of this invention. Such examples should not be taken by way of limitation.

As noted in the above discussions, the novel concepts of this invention as disclosed in connection with FIGS. 1-7 inclusive are particularly adapted to selectively and accurately form a workpiece wherein the sizing constituent has the same etch rate as that of the workpiece. As above discussed, such a common etch rate is largely determined in view of the particular constituents which comprise the workpiece, sizing constituent and etching bath and the working parameters of the working bath (primarily the temperature, which in most work applications is set to comprise a temperature in the range of 100° F. to 150° F.).

However, should it be found in any particular application that the respective etch rates of the workpiece and sizing material cannot be exactly matched, reapplication of the novel concepts of this invention will still provide for the desired accurate fabrication (within the desired tolerances, for example) of such a workpiece. It thus becomes obvious that further applications of the process provide for a vernier-type accurate control of the desired tolerance.

The method by which the process of this invention is carried forth is more fully illustrated in the three examples that follow.

*Example I*

A workpiece 1 comprising an annealed PH15-7 Mo Steel having an original thickness of 0.1090 was fabricated in accordance with the novel concepts of this invention as more particularly disclosed in connection with FIGS. 1-3 inclusive. The sizing material 4 comprised a mixture, by weight, of 1 part iron powder (300 mesh), 1 part molybdenum powder (300 mesh) and 1 part of a standard lacquer. The lacquer was of the hereinbefore mentioned synthetic type. The three constituents were thoroughly mixed and coated onto the roughened top surface 2 of the workpiece by means of a spatula to a thickness slightly in excess of 0.020 in. The workpiece-sizing material unit was then subjected to a temperature of approximately 100° F. for a period of about one hour in order to effect a thorough drying of the sizing constituent 4. The top surface of the sizing constituent 4 was then easily filed to an approximate thickness of 0.020 in. by means of a standard flat (fine) file. The filed surface 5 was noted as being substantially smooth and regular.

The unit was then immersed in an etchant bath essentially comprising the following relative concentrations (by weight): 16% of 10 N hydrochloric acid; 13% of 15 N nitric acid; 33% of 45° Baumé ferric chloride solution: 7% of 40% basic chromic chloride and 31% water. The unit was retained in the etchant constituent for 20 minutes and the etchant was maintained at a temperature approximating 140° F. The final thickness of the workpiece comprised 0.1065 in. The unit was washed with a conventional solvent and the finished workpiece surface 3 was found to be substantially smooth and regular.

*Example II*

Figure 7:
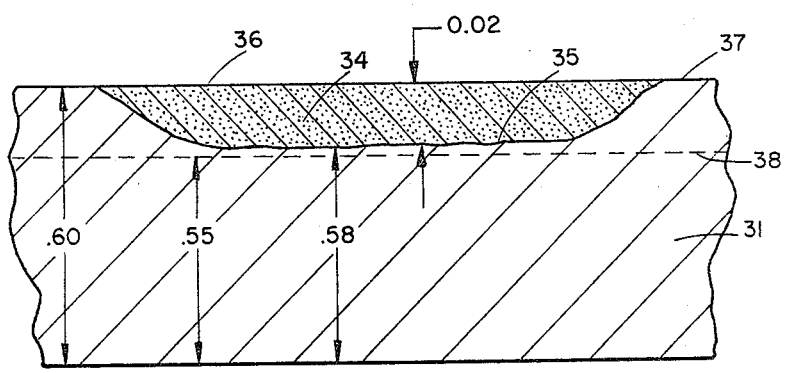
FIG. 7 is a partial cross-sectional view taken on lines 7—7 in FIG. 6.

This example is set forth to more particularly elucidate the novel steps of this invention as applied in connection with the disclosure relevant to FIGS. 6 and 7.

The thickness of a 5" x 5" (square) PH15-7 Mo Steel panel 31 was accurately measured at each grid intersecting point 33 of the grid system 32 as shown in FIG. 6. The low areas 35 (FIG. 7) approximating 0.58 in. were then sprayed with a sizing constituent 34 comprising a layer of substantially pure copper to a total workpiece-sizing thickness slightly in excess of 0.60 in. by means of a conventional plasma spray gun. The top surface of the sizing constituent 34 was then filed so that the top surface 36 thereof was flush relative to the top surface 37 of the workpiece, i.e., until the panel comprises an approximate overall uniform thickness of 0.60 in. The panel was then subjected to a chemical etchant bath of the type set forth in Example I at a temperature of approximately 100° F. for about forty minutes. Removal of the workpiece indicated that said workpiece had been etched to an approximate thickness of 0.55 in.

A washing of the fabricated workpiece in a standard bath disclosed a substantially smooth and regular surface 38.

*Example III*

This example more particularly illustrates the versatility of the novel concepts of this invention as used in conjunction with the hereinbefore discussed FIG. 4 disclosure.

A bar stock type workpiece 11 comprising a Rene 41 alloy initially comprised a one inch square cross-section as depicted by the outer side wall portions 12. The workpiece was coated by means of a conventional brushing technique with a thoroughly mixed sizing constituent 14 comprising, by weight, 17 parts nickel powder (300 mesh) and 3 parts lacquer (of the type set forth in Example I). The sizing constituent was applied to the workpiece until the outer peripheral portions thereof comprised a circular cross-section which was slightly larger than the diagonal distance of the one inch square cross-section of the original workpiece. The sizing-workpiece unit was then subjected to a temperature of 150° F. for approximately one hour, until the sizing constituent was thoroughly dry. The unit was then placed on a conventional lathe and turned down until the outside diameter 15 thereof comprised 1.42 in. Such a diameter 15 was fabricated concentrically relative to the desired circular cross-section 13 of the finished workpiece.

The sizing-workpiece unit was then subjected to the same etching bath hereinbefore set forth in Example I, until the workpiece comprised an outside diameter 13 of 0.900 in. The finished workpiece was then subjected to a conventional cleaning bath. The finished surface of the workpiece was found to be substantially smooth and regular.

It should be understood that the term "etching" or "chemical" etching" as used in this application should be understood to comprise conventional etching techniques. For example, such a term may be understood to comprise such chemical etching processes as those disclosed in U.S. Patent No. 2,739,047 or 2,890,944 or those described in the above explained Examples I-III wherein only chemicals are employed as the etching means; an electro chemical milling process which essentially comprises an electrode, cathode and suitable electrolyte such as diluted sulfuric acid (such a system is generally operated with current densities in the range of 10-20 amps per sq. inch of the etched workpiece surface); or an electrolytic dissolution process which is essentially effected by passing a suitable electrolyte between a cathode tool which is constructed and arranged closely adjacent the anode workpiece (such a system is generally operated with current densities in the range of 200–3,000 amps per square inch of the etched workpiece surface). Therefore, it can be readily seen from the above description that this invention is adapted to be utilized in conjunction with a wide variety of conventional fabrication techniques. Also, it should be again noted that this invention finds particular application in the selective forming of extremely high strength type materials.

Although this invention has been described and illustrated in detail, it is to be understood that the same is by way of illustration and example only and is not to be taken by way of limitation, the spirit and scope of this invention being limited only by the terms of the appended claims.

We claim:

1. A process for selectively forming a surface of a workpiece of a material difficult to machine comprising the steps of selectively distributing an easily machinable coating material having an etch rate in an etchant comparable to the etch rate of said workpiece in said etchant onto the surface of said workpiece, machining a top surface of said coating material into a desired configuration and etching away all of said coating material and a portion of said workpiece until said workpiece comprises a surface conforming to the formed top surface of said coating material.

2. The invention of claim 1 wherein said distributing step comprises selectively spraying said coating material onto the surface of said workpiece.

3. A process for selectively forming a surface of a workpiece of a material difficult to machine to a desired configuration comprising the steps of selectively covering surface portions of a workpiece with an easily machinable coating material having an etch rate in an etchant substantially the same as the etch rate of said workpiece in said etchant, machining at least one surface portion of said coating material into a desired configuration which conforms to the desired configuration of the finished workpiece and etching away all of said coating material and a portion of said workpiece until said coating material is completely etched away and the surface portions of said workpiece assume said desired configuration.

References Cited by the Examiner
UNITED STATES PATENTS

| | | | |
|---|---|---|---|
| 2,157,456 | 5/1939 | Koyemann | 117—8 |
| 2,329,653 | 9/1943 | Rogoff | 156—18 XR |
| 2,411,532 | 11/1946 | Escoffery | 156—18 XR |
| 2,618,846 | 11/1952 | Morris et al. | 117—66 XR |
| 2,620,296 | 12/1952 | Wilsdon | 204—35 |
| 2,739,047 | 3/1956 | Sanz | 156—8 |
| 2,775,535 | 12/1956 | Poole | 204—36 |
| 2,881,059 | 4/1959 | Spencer | 156—18 XR |
| 2,890,944 | 6/1959 | Haye | 156—19 |
| 2,995,462 | 8/1961 | Mitchell et al. | 117—8 |
| 2,997,783 | 8/1961 | Crehan et al. | 117—2 |
| 3,000,755 | 9/1961 | Hanink et al. | 156—3 XR |
| 3,078,203 | 2/1963 | La Boda | 156—18 |
| 3,082,137 | 3/1963 | La Boda | 156—18 |
| 3,108,931 | 10/1963 | Wendell | 204—34 XR |
| 3,113,845 | 12/1963 | Uchida et al. | 204—34 XR |

ALEXANDER WYMAN, *Primary Examiner.*

EARL M. BERGERT, HAROLD ANSHER, CARL F. KRAFFT, *Examiners.*

Disclaimer 3,291,667.—*Samuel Young, Jr.*, La Mirada, and *Dominic C. Mitchell, Jr.*, Arcadia, Calif. ETCHING PROCESS FOR SELECTIVELY FORMING WORKPIECE SURFACES. Patent dated Dec. 13, 1966. Disclaimer filed Sept. 7, 1966, by the assignee, *North American Aviation, Inc.*

Hereby enters this disclaimer to the terminal portion of said patent subsequent to Oct. 1, 1982.

[*Official Gazette February 7, 1967.*]